(12) United States Patent
Yedinak et al.

(10) Patent No.: US 9,559,498 B2
(45) Date of Patent: Jan. 31, 2017

(54) IGNITION CONTROL CIRCUIT WITH DUAL (TWO-STAGE) CLAMP

(71) Applicant: FAIRCHILD SEMICONDUCTOR CORPORATION, San Jose, CA (US)

(72) Inventors: Joseph A. Yedinak, Mountain Top, PA (US); Scott Pearson, Humlock Creek, PA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 139 days.

(21) Appl. No.: 14/671,550

(22) Filed: Mar. 27, 2015

(65) Prior Publication Data
US 2015/0288151 A1 Oct. 8, 2015

Related U.S. Application Data

(60) Provisional application No. 61/976,358, filed on Apr. 7, 2014.

(51) Int. Cl.
*F02P 3/055* (2006.01)
*H01T 15/00* (2006.01)
*F02P 3/04* (2006.01)
*F02P 5/15* (2006.01)

(52) U.S. Cl.
CPC .............. *H01T 15/00* (2013.01); *F02P 3/0442* (2013.01); *F02P 3/055* (2013.01); *F02P 3/0554* (2013.01); *F02P 5/1502* (2013.01); *Y02T 10/46* (2013.01)

(58) Field of Classification Search
CPC .......... F02P 3/055; F02P 3/0552; F02P 3/0554
USPC ................................ 123/618, 624, 630, 651
See application file for complete search history.

(56) References Cited

U.S. PATENT DOCUMENTS

| | | | |
|---|---|---|---|
| 9,013,224 B2* | 4/2015 | Trecarichi ............. | F02P 3/0435 123/578 |
| 9,127,638 B2* | 9/2015 | Shibata ................... | F02P 17/12 |
| 2006/0152865 A1* | 7/2006 | Nair ........................ | F02D 41/20 361/35 |
| 2011/0031979 A1* | 2/2011 | Gillberg ................ | F02P 3/0554 324/546 |

OTHER PUBLICATIONS

Shen, Z. John et al., "A Study on a Dual-Voltage Self-Clamped IGBT for Automotive Ignition Applications", Proceedings of 2001 International Symposium on Power Semiconductor Devices & ICs, Osaka, 2001, 4 pages.

* cited by examiner

*Primary Examiner* — Erick Solis
(74) *Attorney, Agent, or Firm* — Brake Hughes Bellermann LLP

(57) ABSTRACT

In a general aspect, an apparatus can include an insulated gate bipolar transistor (IGBT) device configured to control charging and discharging of an ignition coil and a two-stage voltage clamp coupled with the IGBT device. The two-stage voltage clamp can include a high-voltage portion coupled with the IGBT device and a low-voltage portion coupled with high-voltage portion and the IGBT device. The apparatus can further include a sense device coupled with the two-stage voltage clamp and a timing circuit coupled with the sense device. The timing circuit can be configured to provide a control signal to cause the sense device to enable or disable the high-voltage portion of the two-stage voltage clamp.

22 Claims, 8 Drawing Sheets

IGNITION CONTROL CIRCUIT WITH DUAL (TWO-STAGE) CLAMP

RELATED APPLICATION

This application is a non-provisional of, and claims priority to, U.S. Provisional Application No. 61/976,358, entitled "Ignition Control Circuit with Dual (Two-Stage) Clamp", filed Apr. 7, 2014, which is incorporated by reference herein in its entirety.

TECHNICAL FIELD

This description relates to control circuits. In particular, the description relates to ignition control circuits that can be used in high-voltage applications, such as automotive engine ignition systems.

BACKGROUND

Insulated-gate bipolar transistor (IGBT) devices can be used in a variety of high voltage applications. IGBT devices can be used in ignition control circuits, however, their use within ignition control circuits can be limited by die size, cost, failure rate, and/or so forth.

SUMMARY

In a general aspect, an apparatus can include an insulated gate bipolar transistor (IGBT) device configured to control charging and discharging of an ignition coil and a two-stage voltage clamp coupled with the IGBT device. The two-stage voltage clamp can include a high-voltage portion coupled with the IGBT device and a low-voltage portion coupled with high-voltage portion and the IGBT device. The apparatus can further include a sense device coupled with the two-stage voltage clamp and a timing circuit coupled with the sense device. The timing circuit can be configured to provide a control signal to cause the sense device to enable or disable the high-voltage portion of the two-stage voltage clamp.

Example implementations can include one or more of the following features. For example, the high-voltage portion of the two-stage voltage clamp can include a resistor having a first terminal coupled with a collector terminal of the IGBT device and a first terminal of the sense device and a second terminal coupled with a second terminal of the sense device. The low-voltage portion of the two-stage-voltage clamp can include a diode stack coupled between the second terminal of the resistor and a gate terminal of the IGBT device, the diode stack having a plurality of back-to-back diode pairs. The diode stack can have a blocking voltage less than or equal to 30 volts.

The high-voltage portion of the two-stage voltage clamp can include a first diode stack having a first terminal coupled with a collector terminal of the IGBT device and a first terminal of the sense device and a second terminal coupled with a second terminal of the sense device. The low-voltage portion of the two-stage-voltage clamp can include a second diode stack coupled between the second terminal of the first diode stack and a gate terminal of the IGBT device. The first diode stack can have a blocking voltage greater than or equal to 300 volts and the second diode stack can have a blocking voltage less than or equal to 30 volts. The high-voltage portion of the two-stage voltage clamp can include a resistor and a diode stack coupled with the resistor. The high-voltage portion of the two-stage voltage clamp can be coupled between a collector terminal of the IGBT device and an emitter terminal of the IGBT device.

The timing circuit can include a resistive-capacitive circuit coupled between a gate terminal of the IGBT device and an electrical ground terminal and a field effect transistor. The field effect transistor can have a gate terminal coupled with the resistive-capacitive circuit, a source terminal coupled with the electrical ground terminal and a drain terminal coupled with a control terminal of the sense device.

The IGBT device can be a first IGBT device. The sense device can include a second IGBT device that is coupled in parallel with the high-voltage portion of the two-stage voltage clamp, such that the second IGBT device being in an on-state disables the high-voltage portion of the two-stage voltage clamp. The second IGBT device can include a first bipolar device segment and the first IGBT device can include a second bipolar device segment and a third bipolar device segment, where the first bipolar device segment can be disposed between the second bipolar device segment and the third bipolar device segment.

The timing circuit can be configured to enable the high-voltage portion of the two-stage voltage clamp in response to a gate-to-emitter voltage above a threshold voltage of the IGBT being applied to a gate terminal of the IGBT device and disable the high-voltage portion of the two-stage voltage clamp after the gate-to-emitter voltage changes from the voltage above the threshold voltage to a voltage below the threshold voltage of the IGBT. A time at which the high-voltage portion of the two-stage voltage clamp is disabled can be based on a resistive-capacitive (RC) time constant of the timing circuit.

In another general aspect, an apparatus can include a first insulated gate bipolar transistor (IGBT) device configured to control charging and discharging on an ignition coil in response to an ignition control signal and a second IGBT device having a common collector terminal with the first IGBT device. The apparatus can further include a two-stage voltage clamp that can include a high-voltage portion having a first terminal coupled with the common collector terminal and a second terminal coupled with an emitter terminal of the second IGBT device, the high-voltage portion being configured to be selectively enabled and disabled by the second IGBT device based on the ignition control signal. The two-stage voltage clamp can also include a low-voltage portion coupled between the second terminal of the high-voltage portion and a gate terminal of the first IGBT device, the gate terminal of the first IGBT device being configured to receive the ignition control signal. The apparatus can also include a timing circuit coupled with the gate terminal of the first IGBT device and a gate terminal of the second IGBT device. The timing circuit can be configured to provide a clamp control signal to the gate terminal of the second IGBT device to selectively enable and disable the high-voltage portion of the two-stage voltage clamp, the clamp control signal being based on the ignition control signal.

Implementations can include one or more of the following features. The two-stage voltage clamp, when the high-voltage portion is enabled, can have a first clamping voltage. When the high-voltage portion is disabled, the two-stage voltage clamp can have a second clamping voltage, the second clamping voltage being less than the first clamping voltage.

The timing circuit can includes a field effect transistor (FET) device and a resistive-capacitive (RC) circuit coupled with a gate terminal of the FET device and the gate terminal of the first IGBT device. The FET device can be configured to provide the clamp control signal to the second IGBT device based on charging and discharging of the RC circuit by the ignition control signal.

The high-voltage portion can include a diode stack having a blocking voltage of greater than or equal to 300 V. The low-voltage portion can include a diode stack having a blocking voltage of less than or equal to 30 V. The high-voltage portion can include a resistor. The low-voltage portion can include a diode stack. The high-voltage portion can include a resistor and a diode stack that is coupled in series with the resistor.

In another general aspect, a method can include receiving an ignition control signal at an insulated gate bipolar transistor (IGBT) device, the ignition control signal having a first state and a second state, the first state of the ignition control signal causing the IGBT device to turn on, the second state of the ignition control signal causing the IGBT device to turn off. The method can further include charging a resistive-capacitive (RC) circuit of a timing circuit when the ignition control signal is in the first state, the RC circuit being configured to discharge when the ignition control signal is in the second state. The method can also include providing, by the timing circuit, a clamp control signal to a sense device, the clamp control signal being in a first state when the RC circuit is charged to a voltage above a threshold voltage, the clamp control signal being in a second state when the RC circuit is discharged to a voltage at or below the threshold voltage. The method can still further include enabling, by the sense device, a high-voltage portion of a two-stage voltage clamp when the clamp control signal is in its first state and disabling, by the sense device, the high-voltage portion of the two-stage voltage clamp when the clamp control signal in in its second state.

Implementations can include one or more of the following operations or features. For example, the method can include, clamping, by the two-stage voltage clamp when the high-voltage portion is enabled, a collector voltage of the IGBT device at a voltage of greater than or equal to 350 V. The method can include, clamping, by the two-stage voltage clamp when the high-voltage portion is disabled, the collector voltage of the IGBT device at a voltage of less than or equal to 30 V. The ignition control signal can charge a capacitor of the RC circuit. Disabling the high-voltage portion can include shorting, by the sense device, a first terminal of the high-voltage portion with a second terminal of the high-voltage portion.

BRIEF DESCRIPTION OF THE DRAWINGS

Like reference symbols in the various drawings indicate like and/or similar elements.

DETAILED DESCRIPTION

Figure 1:
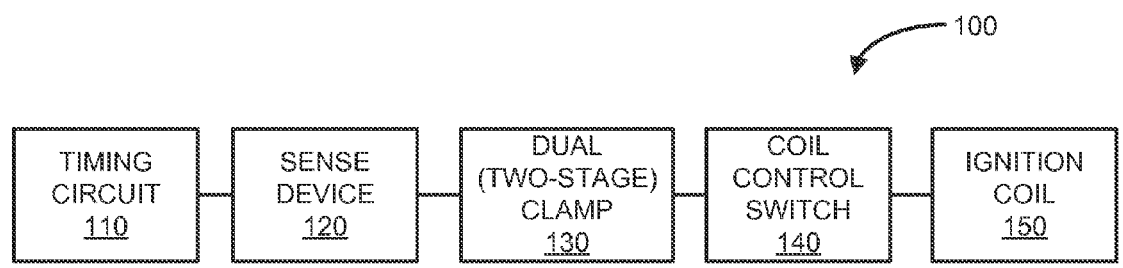
FIG. 1 is a block diagram of an ignition control circuit.

Ignition control circuits that include high voltage switches, such as insulated-gate bipolar transistor (IGBT) devices, can be used in high voltage applications (e.g., 300 V or more), such as in automotive ignition systems. For instance, in such ignition control circuits, IGBT devices can be used as coil drivers (e.g., for controlling charging and discharging of an ignition coil). In such applications, because IGBT devices have high input impedances, they work/interface well with integrated circuits (ICs) that are used for engine control, which are often implemented using complementary metal-oxide semiconductor (MOS) processes.

IGBT devices are also well suited for such automotive applications, as they are capable of blocking high voltages (e.g., 300 V or more) that are generated in automotive ignition systems, and have relatively low conduction variation over the range of temperatures that can be present in an automotive environment (e.g., −40 to 175° C.).

In such automotive ignition applications, an IGBT (which can be referred to as an ignition IGBT, an IGBT device, an ignition IGBT device, and so forth) can be used (e.g., in an ignition control circuit) to control charging and discharging of a primary winding (e.g., an inductor) of an ignition coil. For instance, an ignition IGBT can be turned on to conduct current from a battery through the primary winding of the ignition coil. When a desired current (e.g., a desired amount of energy stored in the primary winding) is reached, the IGBT can be turned off (e.g., by grounding a gate terminal of the IGBT), which causes, as a result of the energy stored in the primary winding, a voltage on a collector terminal of the ignition IGBT (that is coupled with the primary winding) to increase to a high voltage (e.g., 300 V, 400 V or more) and a high current operating the IGBT in a Self Clamp Inductive Switching (SCIS) state initiated for the corresponding ignition control circuit.

The timing (sequencing) of such events in an ignition control circuit can be determined by one or more signals generated by an engine controller (e.g., a microcontroller, a microprocessor, an application specific integrated circuit (ASIC), and so forth). The one or more signals generated by the engine controller can be communicated to an ignition control circuit that includes an IGBT that is used to control firing of a spark plug for a corresponding cylinder of an automotive engine.

In normal operation, the time of electrical stress on the ignition IGBT (when generating a spark across a gap of a spark plug) is short, and an amount of energy (from the stored energy in the primary winding) that is absorbed by the IGBT device is low (e.g., 10-20 milli-joules (mJ) in certain embodiments). In such implementations, the amount of energy absorbed by the IGBT device under normal conditions is low because most of the stored energy (at a point of time of time in an ignition sequence when the IGBT is turned off) is transferred to a secondary winding of the ignition coil, and dissipated as a spark generated across a gap of a spark plug that is coupled with the secondary winding (e.g., to ignite a fuel mixture in an associated cylinder of an internal combustion engine).

In certain situations (e.g., under abnormal operating conditions), the IGBT in such an ignition control circuit can absorb the majority of the energy (for generating a spark under normal conditions) that is stored in the primary winding (e.g., at the point of time in the ignition sequence when the IGBT is turned off to normally initiate spark generation). Such situations (abnormal operating conditions) can occur in an ignition control circuit that is operating when there is an open circuit on a secondary winding of an ignition coil (e.g., as a result of a fouled, damaged, or missing spark plug). Such conditions can be described (referred to) as the ignition control circuit having an open secondary.

In such (open secondary) situations, all the energy (nearly all the energy, a majority of the energy) stored in the primary winding of the ignition coil (for spark generation under normal operating conditions) is dissipated in the ignition IGBT (rather than transferred to a secondary winding for generating a spark). In certain embodiments, this energy can be 200-300 mJ that is dissipated over a 100-200 microsecond (μs) period of time. Due to the short time period over which this energy is dissipated, a majority of the heat that is generated as a result of that energy dissipation can stay within a semiconductor die in which the IGBT is implemented (e.g., due to silicon thermal resistance and capacitance, as well as die thickness). If the active area of the IGBT is not appropriately sized (to safely absorb the energy and dissipate the heat), a peak junction temperature can be reached that causes the IGBT device to fail (e.g., due to current filamentation resulting from localized turning on of the inherent parasitic NPN or PNP bipolar transistors, or a number of other failure mechanisms). Thus, in current implementations, semiconductor die that are used to implement such ignition IGBTs have active areas (die sizes) that are large enough to repeatedly dissipate the energy stored in the primary winding under such abnormal operating conditions. Thus the ignition IGBT device area must be sized to meet a fault condition that may never occur in the life of the vehicle operation. Accordingly, the ignition IGBT device being implemented may result in a larger semiconductor die size than may be needed under normal operating conditions. These larger die sizes increase product costs, and IGBTs implemented on such larger semiconductor die can still be susceptible to failure resulting from open secondary conditions.

FIG. 1 is a block diagram of an ignition control circuit 100 (referred to hereinafter as circuit 100), according to an implementation. The circuit 100, as shown in FIG. 1, includes a timing circuit 110, a sense device 120 (which can also be referred to as a clamp-control device), a dual (two-stage) clamp 130, a coil control switch 140 (e.g., an insulated-gate bipolar transistor (IGBT) device, or other switch device) and an ignition coil 150 (which can be referred to as a coil). The dual (two-stage) clamp 130 can also be referred to as a clamp, a dual clamp, a two-stage clamp, and so forth. The coil control switch 140 can also be referred to as a switch, a control switch, a coil switch and so forth.

In an example implementation, the ignition coil 150 includes a primary winding (e.g., a first inductor) and a secondary winding (e.g., a second inductor) that are electromagnetically coupled with each other. In response to a signal from an engine controller, the circuit 100 can charge the primary winding of the ignition coil 150 (e.g., with a current that is conducted through the coil control switch 140). After charging the primary winding of the ignition coil 150, energy stored in the primary winding, under normal operating conditions, can be transferred to the secondary winding (e.g., as a result of opening the coil control switch 140 in response to a change in the signal from the engine controller) to initiate a spark in a spark plug that is coupled with the secondary winding of the ignition coil 150. In the embodiments illustrated herein (e.g., in FIGS. 2 and 11), however, only primary windings of respective ignition coils are shown, as operation of the circuits described herein is discussed, for purposes of illustration, in the context of the circuits' respective ignition coils having open secondary windings (e.g., operating under abnormal conditions).

As illustrated in FIG. 1, the timing circuit 110 can be coupled with the sense device 120, the sense device 120 can be coupled with the clamp 130, the clamp 130 can be coupled with the coil control switch 140, and the coil control switch 140 can be coupled with the ignition coil 150 (e.g., a primary winding of the ignition coil 150). In the circuit 100, the sense device 120 can be a switch device, such as a transistor, that is controlled by the timing circuit 110, such that the sense device 120 detects (senses) a change in a signal provided by the timing circuit 110 to the sense device 120. In certain implementations, the sense device 120 can be an IGBT device.

In certain embodiments, the clamp 130 can have a first clamp portion and a second clamp portion, where the first clamp portion and the second clamp portion are used in combination (in conjunction with each other) when the clamp 130 is operating in a high-voltage clamp mode and only the first clamp portion or the second clamp portion is used when the clamp 130 is operating in a low-voltage clamp mode. For example, in an implementation, the second clamp portion (e.g., which can be referred to as a low-voltage (clamp) portion) can be configured to have a clamping voltage (e.g., 15-50 V) that is lower than a clamping voltage (e.g., 350-400 V) of the first clamp portion (e.g., which can be referred to as a high-voltage (clamp) portion). In such an approach, only the second clamp portion may be used when the clamp is operating in the low-voltage clamp mode, while the first clamp portion and the second clamp portion may be used in combination when the clamp 130 is operating in the high-voltage clamp mode. Example implementations of such two-stage clamps are described in further detail below.

In an embodiment, the timing circuit 110 can be configured, during operation of the circuit 100, to turn the sense device 120 on and off in order to change operation of the dual (two-stage) clamp 130 between a high-voltage clamp mode and a low-voltage clamp mode, which can prevent damage to the coil control switch 140 under abnormal (open secondary) operating conditions. For instance, in the low-voltage clamp mode, the sense device 120 (and the timing circuit 110) can be configured to short (bypass) the high-voltage portion of the clamp 130 by turning the sense device 120 on. In the high-voltage clamp mode, the circuit 100 (e.g., the timing circuit 110) can be configured to turn the sense device 120 off, so that the high-voltage portion and the low-voltage portion of the clamp 130 operate in conjunction with one another (e.g., the high-voltage portion is not bypassed).

In such an approach, bypassing the high-voltage portion of the claim 130 under open secondary conditions, can lower a voltage (e.g. a clamped voltage) applied to the coil control switch (e.g., a collector terminal of an IGBT device). This can allow energy stored in a primary winding of the ignition coil 150 that is normally for spark generation to be dissipated (in an open secondary condition) over a longer period of time (e.g., 3-5 ms) than if the clamp 130 was in the high-voltage clamp mode (e.g., where dissipation can occur in 100-200 μs). The dissipation occurring over a longer time period reduces a peak instantaneous power and a rate at which heat is generated. This allows the heat associated with that power dissipation to be thermally conducted out of the coil control switch 140 and into a package and/or a heat sink (e.g., a semiconductor die including the coil control switch 140), preventing damage to the coil control switch 140. Further, a smaller die size may be used for the coil control switch 140 than may be used in implementations that do not include a dual (two-stage) clamp 130, sense device 120 and timing circuit 110.

In the circuit 100, the timing circuit 110 may be configured based on a specific implementation. For example, the timing circuit 110 may be configured, for a given ignition timing sequence, to provide a signal to the sense device 120 that switches the clamp 130 from the high-voltage mode to the low-voltage clamp mode at a time (in the given ignition timing sequence) that is after a spark would be generated under normal operating conditions, so as not to interfere with spark generation, but provides the benefits of a longer power dissipation period under open secondary conditions. The timing circuit 110 may be configured (designed) based on the ignition timing sequence of given implementation and can be readily adjusted by modifying the elements of the timing circuit 110.

Figure 2:
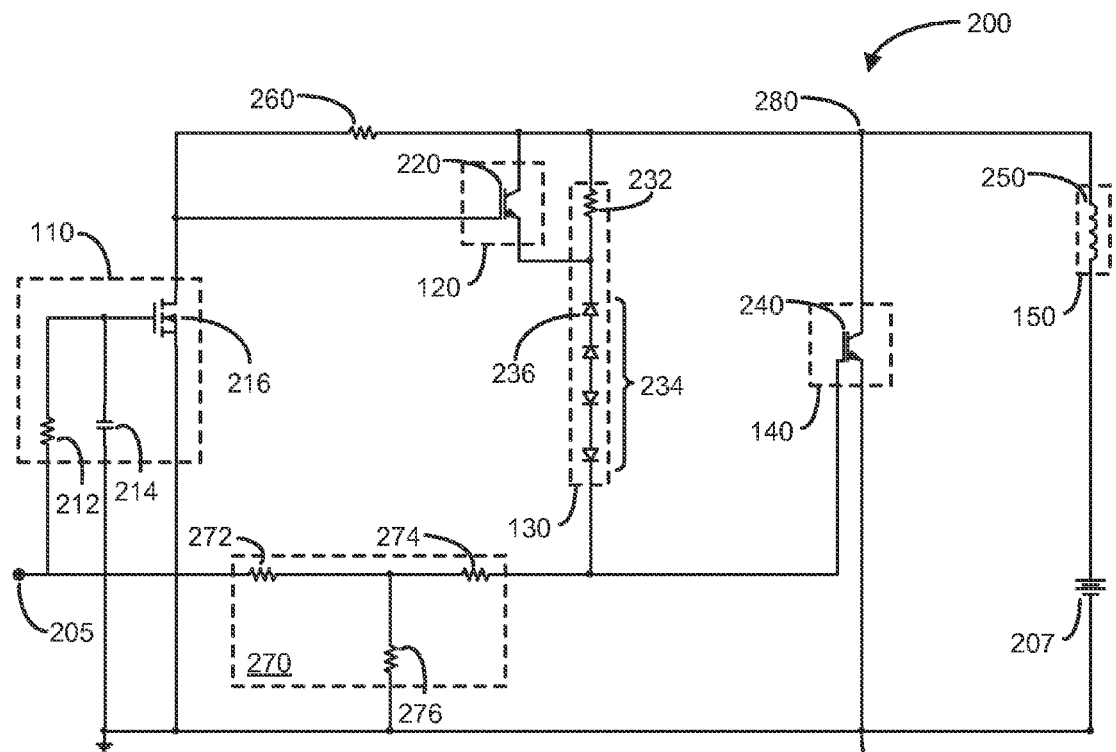
FIG. 2 is a schematic diagram illustrating an ignition control circuit.

FIG. 2 is a schematic diagram illustrating an ignition control circuit 200 (referred to hereinafter as "circuit 200"), according to an implementation. In some implementations, the circuit 200 can be used to implement the ignition control circuit 100 of FIG. 1. Accordingly, for purposes of illustration, like elements of the circuit 200, as those in the circuit 100, are designated with the same reference numbers. For example, the circuit 200 includes a timing circuit 110, a sense device 120, a dual (two-stage) clamp 130 (clamp 130), a coil control switch 140 and an ignition coil 150.

As with the circuit 100, in the circuit 200, the timing circuit 110 is coupled with the sense device 120, the sense device 120 is coupled with the clamp 130, the clamp 130 is coupled with the coil control switch 140, and the coil control switch 140 is coupled with the ignition coil 150 (e.g., a primary winding 250 of the ignition coil 150). As noted above, for purposes of illustration, only the primary winding 250 of the ignition coil is shown in FIG. 2. In the discussion below, the circuit 200, and its operation, is discussed in the context of the ignition coil 150 having an open secondary condition. Accordingly, the secondary winding is not illustrated.

As shown in FIG. 2, the circuit 200 includes an input signal terminal 205, which may be configured to receive an ignition control signal (or signals) from an engine controller (not shown). The circuit 200 may operate (e.g., perform ignition control functions), in response to such an ignition control signal (or signals). Again, in the following discussion, the operation of the circuit 200 is described in the context of the ignition coil 150 having an open secondary. Operation of the circuit 200 under normal conditions is briefly discussed, but is not described in detail. Timing diagrams illustrating the operation of the circuit 200 are illustrated in FIGS. 3 and 5-10, and are discussed below.

As illustrated in FIG. 2, the circuit 200 also includes a battery 207, which may be an automotive battery (e.g., a 12-14 V, high-current battery). In some instances, a supply voltage may be provided to the circuit 200 by an alternator that is configured to charge the battery 207, while in other instances, a supply voltage for the circuit 200 may be provided by the battery 207 in combination with an alternator.

In the circuit 200, the timing circuit 110 can include a resistor 212, a capacitor 214 and an NMOS transistor 216. As shown in FIG. 2, a first terminal of the resistor 212 is coupled with the input terminal 205 and a second terminal of the resistor 212 is coupled with a gate terminal of the NMOS 216. As illustrated in FIG. 2, the NMOS 216 has a source terminal that is coupled with a ground terminal 290. Also in the circuit 200, a first terminal of the capacitor 214 is coupled with the ground terminal 290 and a second terminal of the capacitor 214 is coupled with the gate terminal of the NMOS 216.

Also, in the circuit 200, the sense device 120 can include an IGBT 220, where a gate terminal of the IGBT 220 is coupled with a drain terminal of the NMOS 216. The clamp 130 of the circuit 200, as shown in FIG. 2, can include a resistor 232 (e.g., which may be referred to as a high-voltage clamp portion) and a diode stack 234 (e.g., which may be referred to as a low-voltage clamp portion). As shown in FIG. 2, the diode stack 234 can include a plurality of diodes 236. The diodes 236 can be arranged in a number of ways. For instance, the diodes 236 of the diode stack 234 can be back to back polysilicon diodes, which are formed using alternating P-type polysilicon and N-type polysilicon. In other implementation, the voltage clamp 130 may be implemented in other ways, such as using only series diodes connected anode to cathode with the anode of the first diode connected to the gate of IGBT 240.

In FIG. 2, four diodes 236 are shown in the diode stack 234 for purposes of illustration. In other implementations, additional or fewer diodes 236 may be used. In certain implementations, the diodes 236 may be implemented as back-to-back diode pairs that can be implemented using P-type polysilicon regions alternating with N-type polysilicon regions that are physically adjacent to one another.

The specific number of diodes included in the diode stack 234 can depend on the desired clamping voltage of the diode stack 234 and a breakdown voltage of each of the diodes 236. For instance, in an implementation where each of the diodes 236 has a breakdown voltage of approximately 6 V, and a clamping voltage of the diode stack 234 of approximately 18-30V is desired, the diode stack 234 could include three back-to-back pairs of diodes 236 for total of six diodes, where adjacent diodes 236 of the diode stack 234 have shared cathodes and/or anodes.

In the circuit 200, a resistance value of the resistor 232 may be selected based on a desired clamping voltage for the clamp 130 when operating in a high-voltage clamp mode (e.g., where the high-voltage clamp portion and the low-voltage clamp portion of the clamp 130 operate in conjunction with each other). In other words, the resistance value of the resistor 232 may be selected such that a desired clamping voltage of the resistor 232 in combination with the diode stack 234 is achieved.

As shown in FIG. 2, an emitter terminal of the IGBT 220 is coupled between a first terminal of the resistor 232 and a first terminal of the diode stack 234, while a collector terminal of the IGBT 220 is coupled with a second terminal of the resistor 232. In the circuit 200, the coil control switch 140 can include an IGBT 240, where a gate terminal of the IGBT 240 is coupled with a second terminal of the diode stack 234 and an emitter terminal of the IGBT 240 is coupled with the ground terminal 290. Further, a collector terminal of the IGBT 240 is coupled with the second terminal of the resistor 232 and is also couple with the collector terminal of the IGBT 220 (the sense device 120). In other words, the collector terminal of the IGBT 220, the second terminal of the resistor 232 and the collector terminal of the IGBT 240 share a common node 280 (node 280) in the circuit 200. Further, in the circuit 200, the node 280 is coupled with a first terminal of a primary winding 250 of the ignition coil 150 (the secondary winding of the ignition coil 150 is not shown), while a second terminal of the primary winding 250 is coupled with the battery 207.

The circuit 200 also includes a blocking resistor 260 that prevents high-voltages that are present (generated by the primary winding 250) on the node 280 (e.g., during a spark event) from being applied to the drain terminal of the NMOS 216 and the gate terminal of the IGBT 220. The resistance value of the resistor 260 will depend on the specific implementation and the voltages generated by the primary winding 250 of the ignition coil 150.

As is also shown in FIG. 2, the circuit 200 can include a gate bias circuit 270 that includes resistors 272, 274, 276. In certain embodiments, the gate bias circuit 270 may be configured to limit a current that is applied to the gate terminal of the IGBT 240 when the ignition control signal (e.g., received from an engine controller) is at a "high" value (e.g., to turn on (e.g., activate, close) the IGBT 240). The gate bias circuit 270 may also be configured to quickly discharge the gate terminal of the IGBT 240 when the ignition control signal is switched from the high value to a low value (e.g., to turn off (e.g., deactivate, open) the IGBT 240 and initiate a spark event/initiate discharge of energy stored in the primary winding 250).

In the arrangement shown in FIG. 2, the capacitor 214 or the timing circuit 110 will charge and discharge (through the resistor 212) based on the state of an ignition control signal that is applied to the input terminal 205. For example, when the ignition control signal applied to the input terminal 205 is "high" (e.g., at a value that will turn on the IGBT 240), the capacitor 214 will charge, through the resistor 212, until it reaches a voltage that is equal to (approximately equal to) a voltage of the applied (high) ignition control signal. Conversely, when the ignition control signal applied to the input terminal 205 is "low" (e.g., at a value that will turn off the IGBT 240), the capacitor 214 will discharge, through the resistor 212, until it reaches (approximately reaches) a voltage of the applied (low) ignition control signal (e.g., approximately electrical ground).

In the circuit 200, a resistance value of the resistor 212 and a capacitance value of the capacitor 214 can be selected based on the particular timing requirements for a given implementation. For instance, the resistance value of the resistor 212 and the capacitance value of the capacitor 214 may be selected so the timing circuit 110 (under normal operating conditions) does not cause the sense device 120 (the IGBT 220) to bypass the high-voltage portion (e.g., short the resistor 232 of the clamp 130) just prior to, or during a spark event, for a given ignition timing sequence.

Further, the resistance value of the resistor 212 and the capacitance value of the capacitor 214 may be selected so the timing circuit 110 (under an open secondary condition) causes the sense device 120 (the IGBT 220) to bypass (short) the resistor 232 at a time, for the given ignition timing sequence, after which a spark event would be initiated (under normal operating conditions) that allows for the benefits (such as those described above) of reducing a clamping voltage of the clamp 130. Such benefits may include, for example, extending an amount of time over which energy stored in the primary winding 250 (in an open secondary condition) is dissipated, which can prevent damage to the coil control switch 140 (the IGBT 240) and can also allow for using a smaller IGBT (due to the reduced thermal stress associated with the low-voltage clamping mode of the clamp 130).

Figure 3:
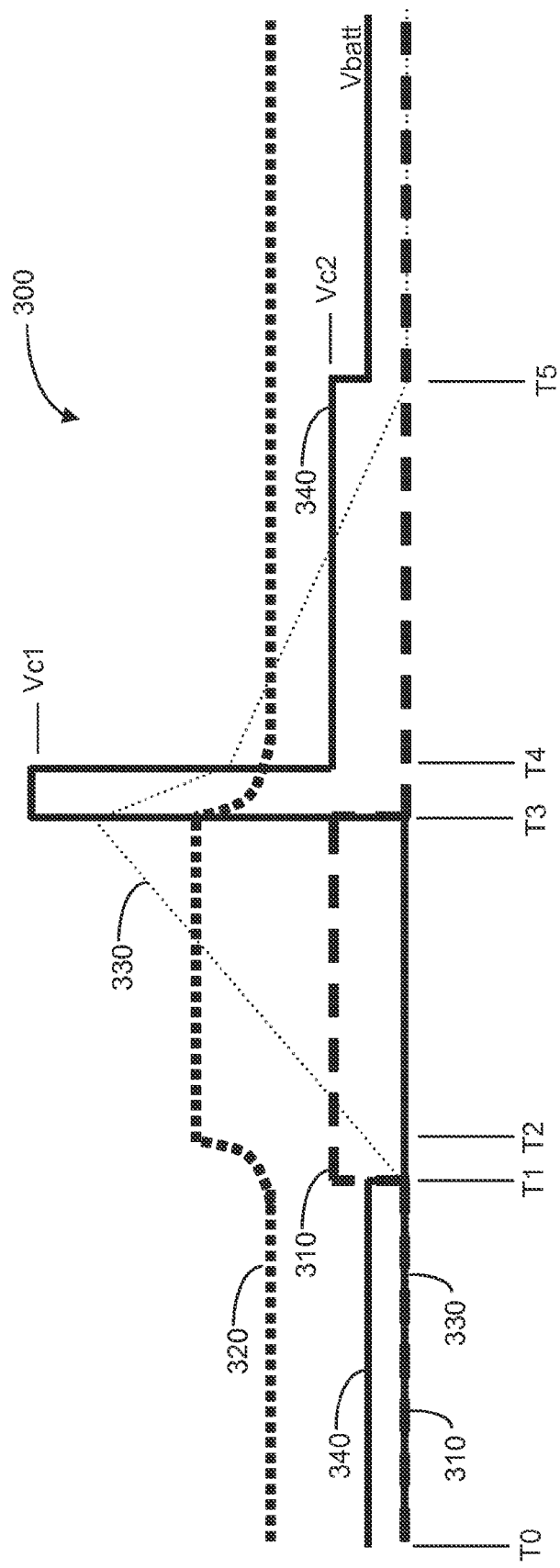
FIG. 3 is a timing diagram illustrating operation of the ignition control circuits of FIGS. 2, 4, 11 and 12.
Figure 4:
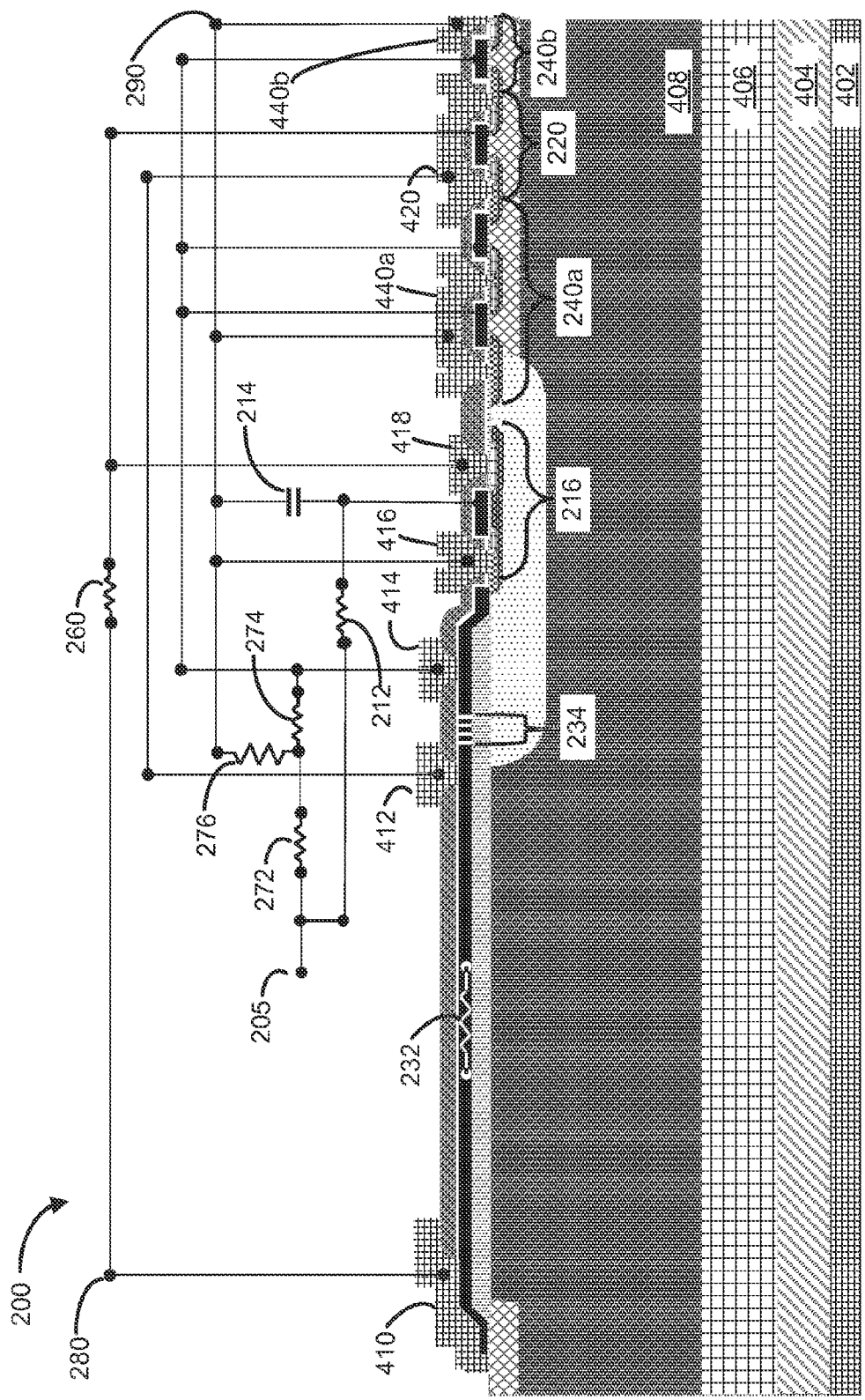
FIG. 4 is a diagram illustrating a portion of the circuit of FIG. 2 in a cross-sectional view in a semiconductor die.

FIG. 3 is a timing diagram 300 illustrating operation of the ignition control circuit 200 of FIGS. 2 and 4 (as well as the ignition control circuit 1100 of FIGS. 11 and 12) according to an implementation. For purposes of illustration, the timing diagram 300 will be described with further reference to FIG. 2.

As illustrated in FIG. 3, the timing diagram 300 includes plots of various voltages and currents over time for a single, ignition timing sequence of the circuit 200 under an open secondary condition. In the timing diagram 300, the magnitudes (on the y-axis) of the plots in the timing diagram 300 are not necessarily shown to scale relative to one another, but are normalized to illustrate the relative changes in the illustrated voltages and currents at specific times (on the x-axis) during the given ignition timing sequence. Also, for purposes of illustration, the plots of the signals at the specific times described with respect to FIG. 3 may be exaggerated to show their relationships. The actual timing and magnitudes of the voltages and currents illustrated in FIG. 3 will depend on the specific implementation.

In the timing diagram 300, the plot 310 (which is a first dashed line) illustrates a gate voltage of the IGBT 240 (e.g., an ignition control signal applied to the input terminal 205). The plot 320 (which is a second dashed line) illustrates a gate voltage of the NMOS 216 (e.g., a voltage across the capacitor 214). In the timing diagram 300, the plot 320, for purposes of illustration, is offset from the other plots in the timing diagram 300. For the circuit 200, the low value of the plot 320 can be approximately coincident with the low value of the plot 310 (and the plot 340), e.g., approximately equal to the on-state voltage drop of the IGBT 240. This relationship (between the plot 310 and the plot 320) is further illustrated below with respect to FIGS. 5 and 8.

Also in the timing diagram 300, the plot 330 (which is a dotted line) illustrates a coil current of the primary winding 250 of the ignition coil 150 in the circuit 200. In FIG. 3, the plot 340 (which is a solid line) illustrates the collector voltage of the IGBT 220 and the IGBT 240 of the circuit 200 (e.g., the voltage on node 280) during the given ignition timing sequence.

In the timing diagram 300, at a time T0, the gate voltage of the IGBT 240 (the coil control switch 140), as illustrated by the plot 310, is at a low value (e.g., approximately electrical ground), which would cause the IGBT 240 to be in an off-state (e.g., not conducting current). As is also shown in FIG. 3, at time T0, the gate voltage of the NMOS 216 (the voltage across the capacitor 214), as illustrated by the plot 320, is also at a low value (e.g., approximately electrical ground), which would cause the gate terminal of the IGBT 220 (the sense device 220) to float to a high value (established by the collector voltage on the node 280 across the resistor 260), which would cause the IGBT 220 to turn on. The IGBT 220 turning on would cause the IGBT 220 to short (bypass) the resistor 232 (e.g., the high-voltage portion) of the clamp 130, causing the clamp 130 to operate in its low-voltage operating mode. However, at time T0, a voltage on the node 280 (e.g., a collector voltage of the IGBTs 220, 240), as illustrated by the plot 340, may be at a voltage that is approximately equal to a voltage (Vbatt) of the battery 207. Accordingly, the collector voltage of the IGBTs 220, 240, at time T0, may be below a clamping voltage of the low-voltage clamping portion of the clamp 130 for the circuit 200. Therefore, the collector voltage of the IGBTs 220, 240 (a voltage on the node 280) may not be affected (clamped) by the clamp 130 at time T0.

At time T1 in the timing diagram 300, as illustrated by the plot 310, the ignition control signal (e.g., the signal on the gate of the IGBT 240) switches from its low state to its high state, which turns on the IGBT 240. As shown by the plot 320 in FIG. 3, at time T1, the voltage on the gate terminal of the NMOS 216 begins to increase as the capacitor 214 charges (from the voltage potential of the ignition control) signal through the resistor 212. As shown by the plots 330, 340, at time T1, the collector voltage of the IGBTs 220, 240 (on the node 280), as shown by the plot 340, drops to an on-state voltage drop of the IGBT 240 (or approximately 0) and the coil current, as shown by the plot 330, begins to increase.

At time T2 in the timing diagram 300, as illustrated by the plot 320, the voltage on the gate terminal of the NMOS 216 reaches a high state (e.g., as a voltage across the capacitor reaches a potential approximately equal to the voltage of the ignition control signal applied to the input terminal 205). Once the voltage on the gate terminal of the NMOS 216 is greater than a threshold voltage of the NMOS 216, the NMOS 216 will turn on (e.g., conduct), causing the gate terminal of IGBT 220 to be coupled to the ground terminal 290, turning the IGBT 220 off and causing the clamp 130 to operate in its high-voltage clamping (e.g., using the resistor 232 and the diode stack 234 in conjunction with each other to clamp voltages applied on the node 280).

At time T3 in the timing diagram 300, as illustrated by the plot 310, the voltage on the gate terminal of the IGBT 240 (e.g., the ignition control signal received on the input terminal 205) switches from its high state to its low state (e.g., causing the IGBT 240 to turn off). As a result of the IGBT 240 turning off, as illustrated by the plot 340, the collector voltage (on the node 280) goes from approximately 0 V up to a high-voltage clamp voltage (Vc1) of the clamp 130 (e.g., a clamping voltage of the clamp 130 when the IGBT 220 is off and the resistor 232 is not bypassed). In certain implementations, Vc1 can be 300 V, 400V, or more.

Also, at time T3 in the timing diagram 300, as illustrated by the plot 320, the voltage applied on the gate terminal of the NMOS 216 (the voltage across the capacitor 214) begins to decrease, where the rate of decrease depends on the values of the resistor 212 and the capacitor 214. In this implementation, the capacitor 214 will discharge through the resistor 212 to electrical ground (or approximately electrical ground), e.g., such as through a signal buffer on an engine controller that is providing the ignition control signal (at its low state) on the input terminal 205 of the circuit 200.

As noted above, the timing diagram 300 illustrates operation of the circuit 200 for a single ignition control timing sequence when an open secondary is present (e.g., on a secondary winding of the ignition coil 150). In this situation (an open secondary), at time T3 in the timing diagram 300, the energy that is stored in the primary winding 250 between the times T1 and T3 of the timing diagram 300 will start to dissipate through the IGBT 240, causing the coil current (plot 330) to start to decrease at time T3.

At time T4 in FIG. 3, as illustrated by the plot 320, the voltage applied on the gate terminal of the NMOS 216 has decreased to electrical ground (or approximately electrical ground). In the circuit 200, once the voltage on the gate terminal of the NMOS 216 is less than its threshold voltage, the NMOS 216 will turn off (e.g., no longer conduct), causing the gate terminal of the IGBT 220 to change to a high state, which will be established from the collector voltage (on the node 280) across the resistor 260.

The gate of the IGBT 220 changing to a high-state will cause the IGBT 220 to turn on (e.g., conduct) and bypass (short out) the resistor 232 (e.g., bypass the high-voltage portion of the clamp 130). This will result in the clamp 130 operating in its low voltage clamping mode (e.g., using only the diode stack 234 to clamp the collector voltage of the IGBT 240 (and the collector voltages of the IGBT 220) on the node 280).

As illustrated in FIG. 3 by the plot 340, the collector voltage of the IGBTs 220, 240 (on the node 280), at time T4, drops from its high-voltage clamping level (Vc1) to a low voltage clamping level (Vc2) for the clamp 130. In certain implementations, Vc2 can be in a range of 18-30 V, though other voltage ranges are possible, and will depend on the specific ignition control circuit and battery voltage.

As discussed herein, once the clamp switches from operating in the high-voltage clamping mode to operating in the low-voltage clamping mode, the energy in the primary winding 250 of the ignition coil 150 will be dissipated over a longer period of time (e.g., 3-5 ms) as compared to an amount of time over which the energy would be dissipated at the high-voltage clamping level (Vc1) in an open secondary condition. In comparison with the timing diagram 300, under normal operating conditions, the energy stored (the majority of the energy stored) in the primary winding 250 of the ignition coil 150 at time T3 would be transferred to a secondary winding of the ignition coil 150 and dissipated as a spark in a spark plug coupled with the secondary winding. In example implementations, this transfer of energy would occur prior to the time T4 (and after the time T3) in the timing diagram 300. Accordingly, changing the clamp 130 from operating in a high-voltage clamping mode to operating in a low voltage clamping mode at time T4 will not affect the operation of the circuit 200 (e.g., spark generation) under normal operating conditions as long as elements of the timing circuit 110 are selected to allow enough time for completion of spark generation for each ignition control timing sequence before the clamp 130 is changed to operate in its low-voltage clamping mode.

At time T5 in the timing diagram 300, as shown by the plot 330, all of the energy stored (the majority of the energy stored) in the primary winding 250 of the ignition coil 150 is dissipated and the current in the primary winding 250 is at or near zero.

Also at the time T5 in the timing diagram 300, once the energy in the primary winding 250 of the ignition coil 150 is dissipated, the collector voltage of the IGBTs 220, 240 may return to the battery voltage Vbatt, which, in this implementation, is below the low-voltage clamp level (Vc2) of the clamp 130. As shown in FIG. 3, at time T5 in the timing diagram 300, the signals illustrated by the plots 310, 320, 330, 340 are at substantially their same respective levels as at the time T0 in the timing diagram 300.

FIG. 4 is a diagram illustrating a portion of the circuit 200 of FIG. 2 in a cross-sectional view as implemented in a semiconductor die, according to an implementation. In FIG. 4, for purposes of illustration, part of the circuit 200 shown in FIG. 2 is shown in schematic diagram form with its corresponding connections with the elements illustrated in the cross-sectional diagram portion of FIG. 4. As illustrated in FIG. 4, the elements of the clamp 130, the IGBT 220 and the IGBT 240 are included the semiconductor die (and shown in the cross-sectional view portion of FIG. 4).

In certain implementations, the elements of FIG. 4 shown in schematic diagram form may also be included in the semiconductor die of FIG. 4. In other implementations, the elements of the circuit 200 shown in schematic diagram form in FIG. 4 may be implemented as discrete passive devices on a printed circuit board along with the semiconductor die shown in cross-sectional view portion of FIG. 4. In other embodiments, other arrangements are possible. For instance, multiple semiconductor dice may be used to implement the elements of the circuit 200 or, as another alternative, discrete devices may be used to implement each of the elements of the circuit 200.

Comparing FIG. 4 with the schematic diagram of FIG. 2, the ignition coil 150 and the battery 207 of FIG. 2 are not illustrated in FIG. 4, while the other elements of the circuit 200 are referenced with the same reference numbers in FIG. 4 as in FIG. 2. For purposes of brevity and clarity, each element of the circuit 200 is not described again in detail with respect to FIG. 4. The following discussion of FIG. 4 describes the elements of the circuit 200 that are shown in the cross-sectional view portion of FIG. 4, as well as describing additional aspects of the semiconductor die used to implement the clamp 130, the IGBT 220 and the IGBT 240.

As shown in FIG. 4, the semiconductor die may include a backside (bottom side) collector metal connection 402, which may be formed using a conductive metal layer that is deposited on the backside of a semiconductor wafer. The semiconductor die may also include a heavily doped substrate (e.g., P+ substrate) 404, an epitaxial buffer layer (e.g., an N epitaxial buffer layer) 406 and a lightly doped epitaxial layer (e.g., an N− epitaxial layer) 408. In other implementations, the conductivity types of these layers may be different. For instance, in some implementations, the epitaxial layers 406, 408 may P-type and the substrate 404 may be N-type.

As shown in FIG. 4, the resistor 232 of the clamp 130 may be implemented as a polysilicon resistor and the diode stack 234 may be implemented as back-to-back polysilicon diodes that are implemented using alternating N-type and P-type polysilicon regions (not individually labeled). Electrical connections for the schematically illustrated elements of the circuit 200 with the cross-sectional view of the resistor 232 and the diode stack 234 are shown in FIG. 4, and correspond with the electrical connections shown in FIG. 2 for the circuit 200.

Further, as shown in the cross-sectional drawing portion of FIG. 4, the NMOS 216 may be implemented as a lateral transistor device that has a metal source contact 416 and a metal drain contact 418. Electrical connections for the schematically illustrated elements of the circuit 200 with the cross-sectional view of the metal source contact 416, the metal drain contact 418 and the gate terminal of the NMOS 216 are shown in FIG. 4, and correspond with the electrical connections shown in FIG. 2 for the circuit 200.

As also shown in the cross-sectional view portion of FIG. 4, the semiconductor die may include a plurality of adjacent IGBT device segments that may be used to implement the IGBT 220 and the IGBT 240, where the IGBT 220 and the IGBT 240 are implemented using alternating IGBT segments. For example, the IGBT 220 (the sense device 120) can be implemented by a single IGBT segment that has a metal emitter connection 420. Electrical connections for the schematically illustrated elements of the circuit 200 with the cross-sectional view of the emitter terminal of the IGBT 220 and the gate terminal of the IGBT 220 are shown in FIG. 4, and correspond with the electrical connections shown in FIG. 2 for the circuit 200.

Similarly, the IGBT 240 may be implemented by three IGBT segments (e.g., the two segments 240a and the single segment 240b). Electrical connections for the schematically illustrated elements of the circuit 200 with the cross-sectional view of the with the emitter terminals and the gate terminals of the segments 240a, 240b of the IGBT 240 are shown in FIG. 4, and correspond with the electrical connections shown in FIG. 2 for the circuit 200.

In some implementations, the IGBTs 220, 240 can be implemented using other numbers of IGBT segments than those shown in FIG. 4. The number and size of the IGBT segments used to implement the IGBTs 220, 240 in an ignition control circuit can depend on the particular implementation.

As also illustrated in the cross-sectional view portion of FIG. 4, the semiconductor die may also include a front-side common collector metal contact 410 (that is electrically shorted with the backside collector metal connection 402). As shown in FIG. 4, the front side common collector metal contact 410 corresponds with the node 280 of the circuit 200. As further shown in FIG. 4, the semiconductor die may include a metal contact 412 that is used to short the emitter of the IGBT 220 (the sense device 120) with node between the resistor 232 (the high-voltage portion of the clamp 130) and the diode stack 234 (the low voltage portion of the clamp 130) and allow for the IGBT 220 to short out the resistor 232 (e.g., when the clamp 130 is operating in it low-voltage clamping mode).

Figure 5:
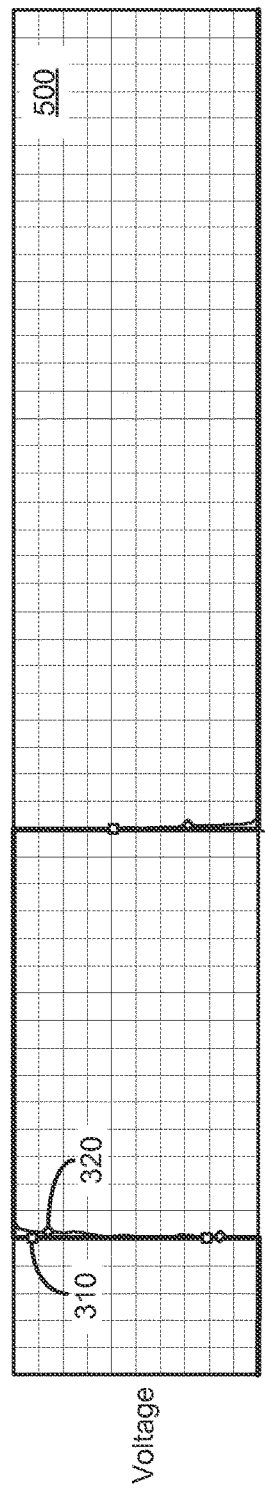
FIGS. 5, 6 and 7 are timing diagrams separately illustrating signals shown in FIG. 3.
Figure 6:
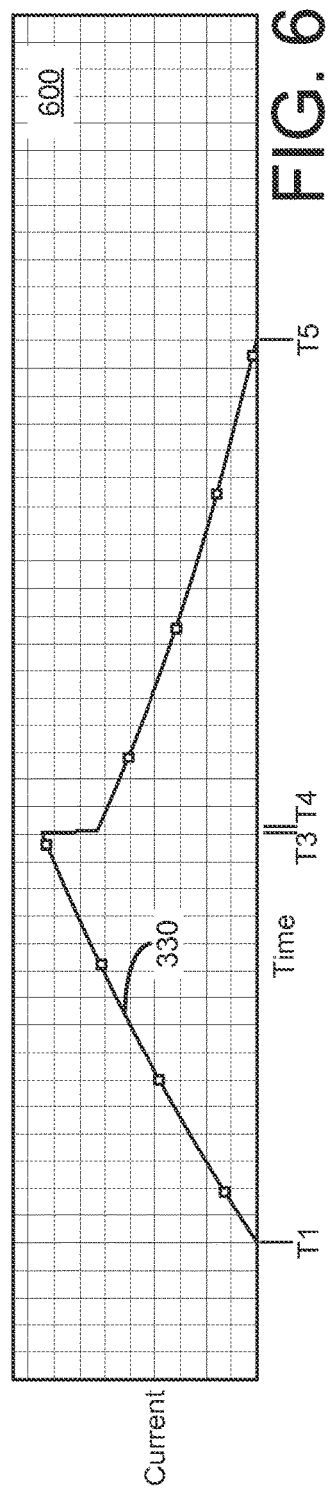
Figure 7:
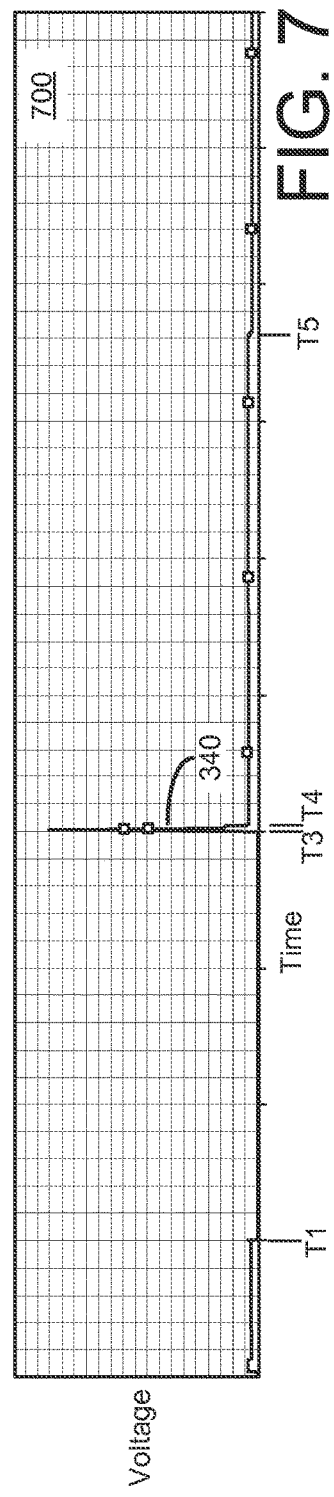
Figure 8:
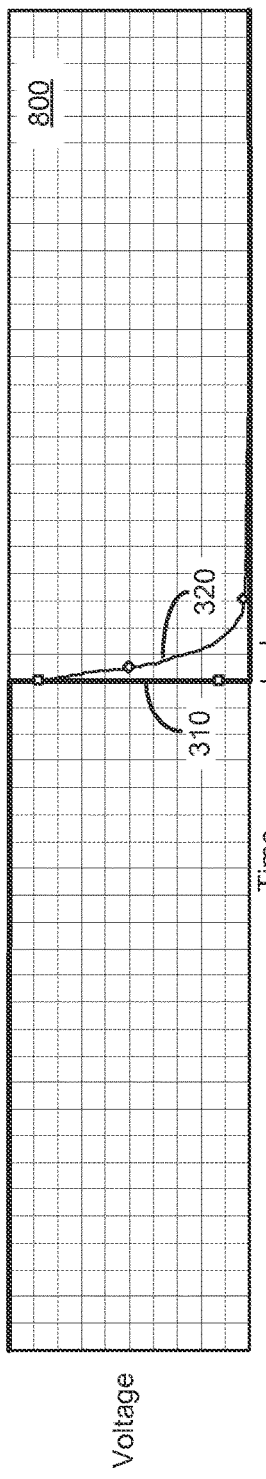
FIGS. 8, 9 and 10 are timing diagrams illustrating magnified views of portions of the timing diagrams illustrated, respectively, in FIGS. 5, 6 and 7.
Figure 9:
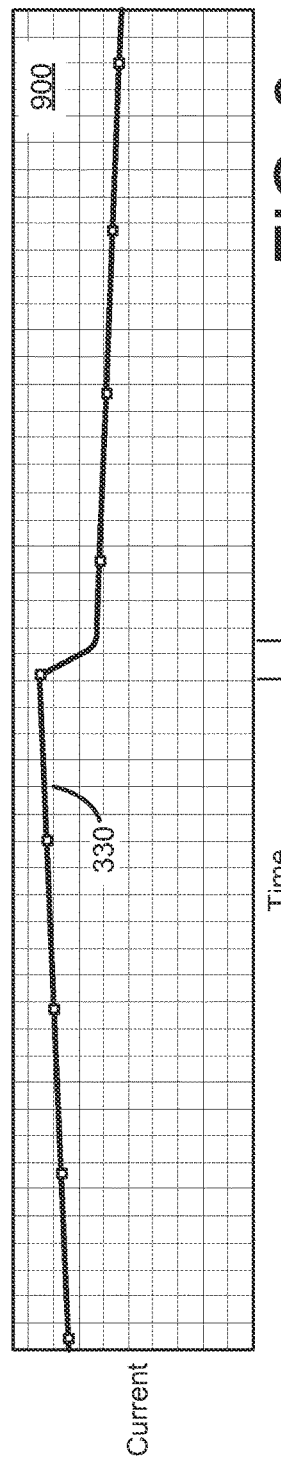
Figure 10:
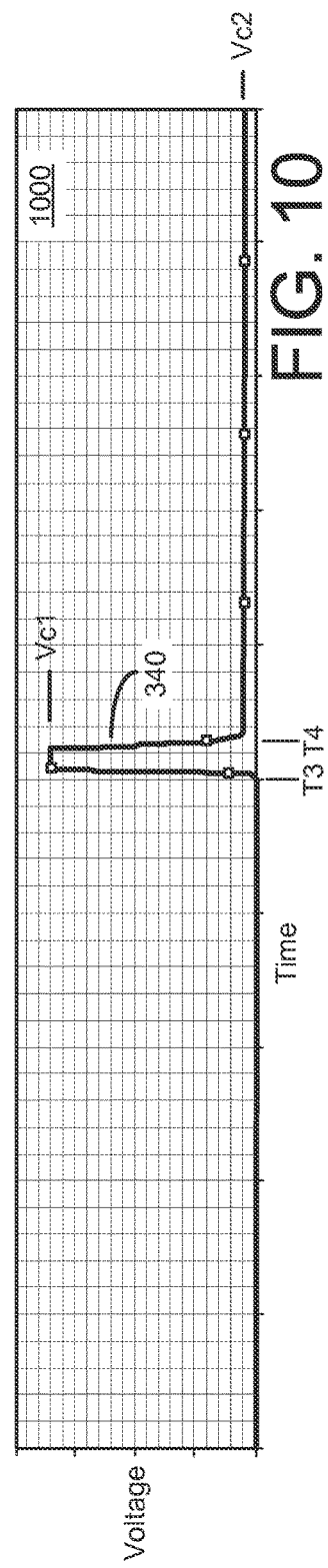

FIG. 5 through 7 are timing diagrams 500, 600, 700 separately illustrating the signals of FIG. 3 for operation of the circuit 200, as that operation was described above, according to an implementation. FIGS. 8 through 10 are timing diagrams 800, 900, 1000 illustrating magnified views of portions of the respective timing diagrams 500, 600, 700, according to an implementation. As compared with the illustrative plots shown in FIG. 3, the timing diagrams 500 through 1000 illustrate circuit simulation results for a specific implementation of the circuit 200.

As the operation of the circuit 200 has already been discussed in detail with respect to the timing diagram 300 shown in FIG. 3, for purposes of brevity and clarity, that discussion is not repeated again with reference to FIGS. 5 through 10. In the following discussion, the specific signals from FIG. 3 shown in each of the timing diagrams 500 through 1000 are briefly discussed. In each of FIGS. 5 through 7, a same, first timing scale is used, with those timing diagrams being vertically aligned with each other. Likewise, in each of FIGS. 8 through 10, a same, second timing scale is used, with those timing diagrams being vertically aligned with each other. As appropriate, and where illustrative, the times T1 through T5 from the timing diagram 300 in FIG. 3 are indicated on the timing diagrams 500 through 1000.

The timing diagram 500 in FIG. 5 illustrates the plot 310 of the gate voltage of the IGBT 240 (e.g., an ignition control signal applied to the input terminal 205 of the circuit 200) and the plot 320 of the voltage applied to the gate terminal of the NMOS 216 of the timing circuit 110 (e.g., the voltage across the capacitor 214). As shown in FIG. 5, the plots 310 and 320 are similar in timing and magnitude, with the rising and falling edges of the plot 320 (the voltage applied to the gate terminal of the NMOS 216) trailing the rising and falling edges of the plot 310 (the voltage applied to the gate terminal of the IGBT 240), which is due to the charging/discharging time of the capacitor 214 in the timing circuit 110 (e.g., which prevents interference with spark generation under normal operating conditions). The times T1 and T3 are indicated in FIG. 5 to illustrate the timing of the rising and falling edges of the plot 310 (e.g., the ignition control signal applied to the input terminal 205 and the gate terminal of the IGBT 240. Due to the time scale in FIG. 5, the times T2 and T4 are not shown as they are too close to times T1 and T3, respectively, to be clearly illustrated.

The timing diagram 600 in FIG. 6 illustrates the plot 330 of the coil current in the primary winding 250 of the ignition coil 150 of the circuit 200. The plot 330 in FIG. 6 shows the changes in coil current at times T1, T3, T4 and T5 in the primary winding 250 that were described above with respect to FIG. 3. Likewise, the timing diagram 700 in FIG. 7 illustrates the plot 340 of the collector voltage of the IGBTs 220, 240 (e.g., the voltage on the node 280) of the circuit 200. The plot 340 in FIG. 7 shows the changes in collector voltage at times T1, T3, T4 and T5 in the primary winding 250 that were described above with respect to FIG. 3.

FIG. 8 is a timing diagram 800 that illustrates a magnified view along the x-axis (time axis) of the plots 310 and 320 shown in FIG. 5 (centered around the times T3 and T4). The timing diagram 800 illustrates a magnified view of the voltage changes of the plots 310 and 320 at the times T3 and T4, as were discussed above with respect to the timing diagram 300 in FIG. 3. As shown in FIG. 8, the falling edge of the plot 320 (the voltage applied to the gate of the NMOS 216 in the timing circuit 110) trails the falling edge of the plot 310 (the voltage of the input supply signal applied to the gate terminal of the IGBT 240). This delay in the falling edge of the plot 320 allows the ignition control circuit 200 to complete initiation of a spark across the electrodes of a spark plug coupled with a secondary winding (not shown) of the ignition coil 150 before the timing circuit 110 causes the sense device 120 (e.g., the IGBT 220) to turn on and short out (bypass) the high-voltage portion (e.g., the resistor 232) of the clamp 130, such as described with respect to FIG. 3.

The timing diagram 900 in FIG. 9 illustrates the plot 330 of the coil current in the primary winding 250 of the ignition coil 150 of the circuit 200, showing the changes in coil current at the time T3 and T4, as discussed above with respect to FIG. 3. Likewise, the timing diagram 1000 in FIG. 10 illustrates the plot 340 of the collector voltage of the IGBTs 220, 240 (on the node 280) of the circuit 200, showing the changes in collector voltage (e.g., clamped at Vc1 at time T3 and clamped at Vc2 at time T4), as were discussed above with respect to FIG. 3.

Figure 11:
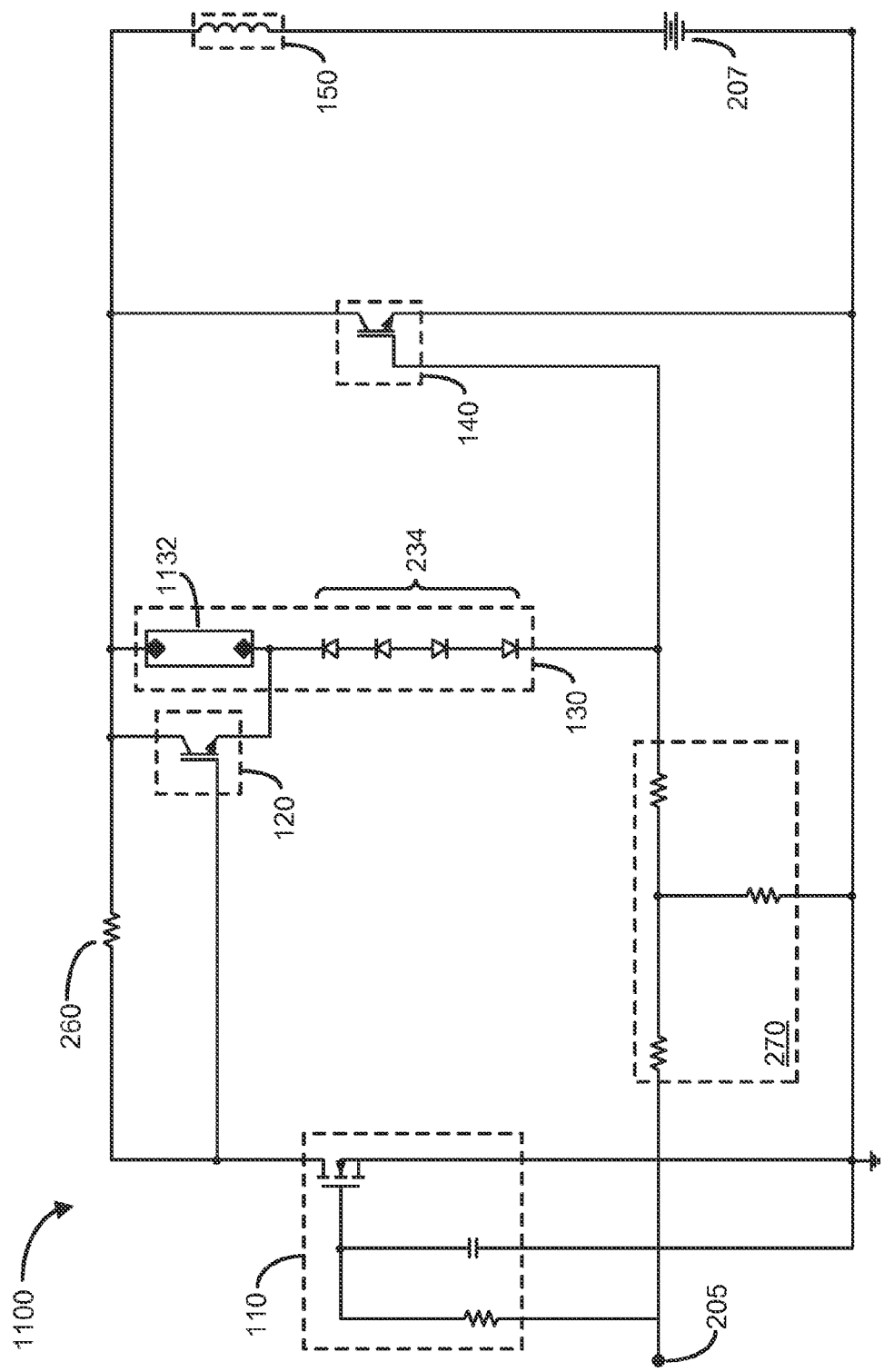
FIG. 11 is a schematic diagram of another ignition control circuit.

FIG. 11 is a schematic diagram of another ignition control circuit 1100, according to an implementation. The schematic diagram of the ignition control circuit 1000 is the same as the ignition control circuit 200 shown in FIG. 2, with the exception that the resistor 232 (e.g., the high-voltage portion of the clamp 130) is replaced with high-voltage portion 1132, which may include a diode stack and/or a resistor. In the high-voltage portion 1132 of FIG. 11, individual diodes of a corresponding diode stack and/or a resistor are not shown. In certain embodiments, a diode stack of the high-voltage portion 1132 may include back-to-back diodes, such as those discussed herein, such as with respect to the diode stack 234. In certain implementations, the high-voltage portion 1132 of the clamp 130 in FIG. 11 may also include a resistor, such as the resistor 232, in combination with one or more back-to-back diode pairs.

Such approaches may allow for a high-voltage clamp voltage (Vc1) of the clamp 130 to be accurately established based on a breakdown voltage of each diode used in a diode stack of the high-voltage portion 1132 (and in the diode stack 234). For instance, in an implementation where the diodes used in the diode stacks 234 and the high-voltage portion 1132, each have a breakdown voltage of 5 V, a low-voltage clamp voltage (Vc2) of 30 V is desired, and a high-voltage clamp voltage of 400 V is desired, the diode stack 234 may include 6 back-to-back diodes, to achieve a Vc2=30 V. Also in this implementation, a diode stack of the high-voltage portion 1132 may include 75 back-to-back diodes, to achieve a breakdown voltage of 370 V, which achieves a Vc1=400 V, with the diode stack of the high-voltage portion 1132 in combination with the diode stack 234 in the clamp 130.

Operation of the circuit 1100 may also be implemented as illustrated by the timing diagram 300 and 500 through 1000, which were discussed above. In the circuit 1100, the IGBT 220 shorts out (bypasses) the high-voltage portion 1132 (rather than the resistor 232) to change the clamp 130 from a high-voltage clamping mode to a low-voltage clamping mode.

Figure 12:
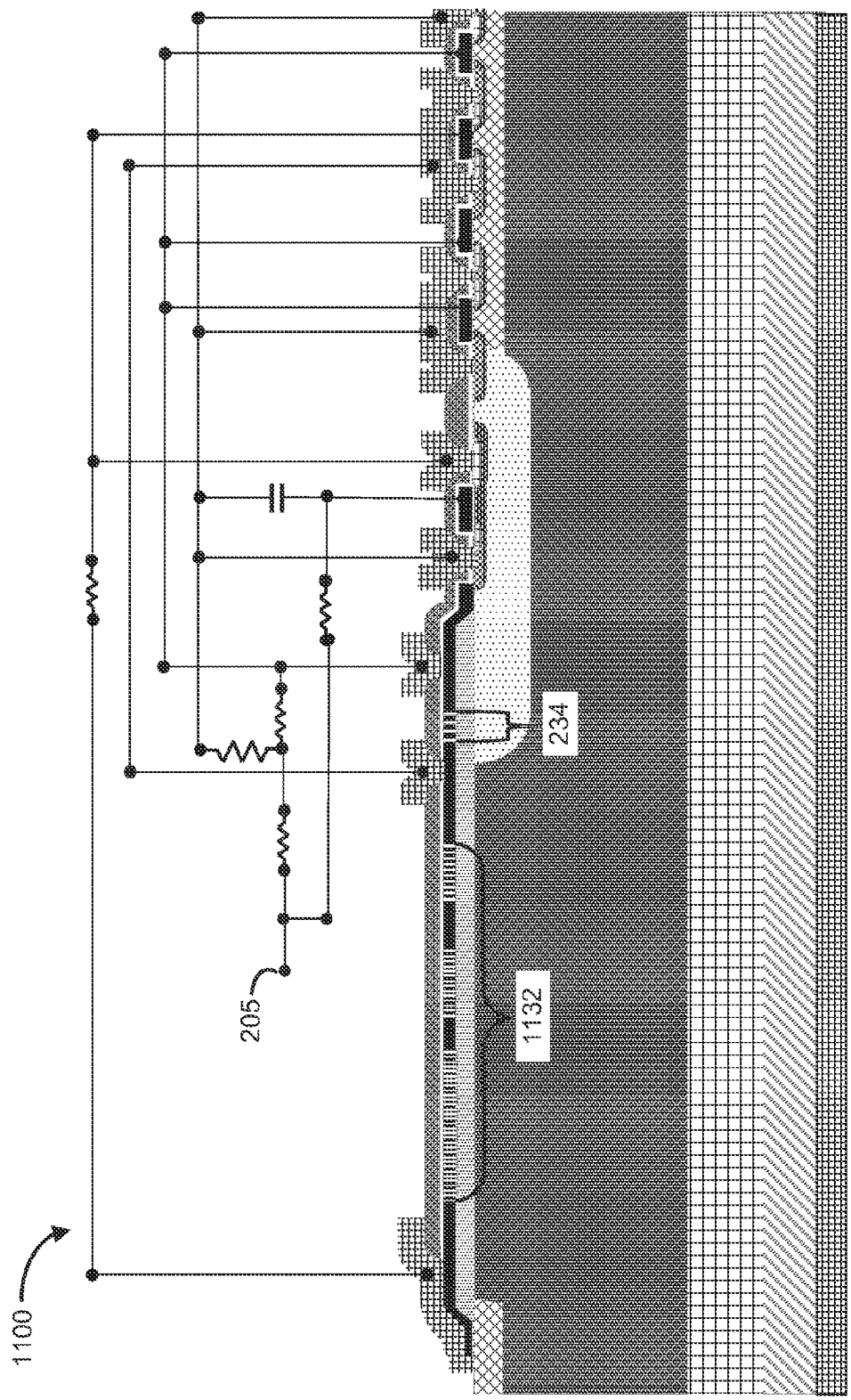
FIG. 12 is a diagram illustrating a portion of the circuit of FIG. 11 in a cross-sectional view in a semiconductor die.

FIG. 12 is a diagram illustrating a portion of the circuit 1100 of FIG. 11 in a cross-sectional view in a semiconductor die and a portion of the circuit 1100 in schematic diagram form, according to an implementation. The diagram shown in FIG. 12 is the same as the diagram illustrated in FIG. 4, expect that the high-voltage portion 1132 of the clamp 130 is implemented by a diode stack (which, in this implementation, includes approximately 50 back-to-back diode pairs). Accordingly, the breakdown voltage of the diode stack of the high-voltage portion 1132 would be higher than the breakdown voltage of the diode stack 234, which include, in this implementation, approximately 6 back-to-back diode pairs. As discussed above, in certain implementations the high-voltage portion 1132 of the two-stage clamp in FIG. 12 could be implemented by a resistor in combination (e.g., coupled electrically in series with) a plurality of back-to-back diode pairs.

Figure 13:
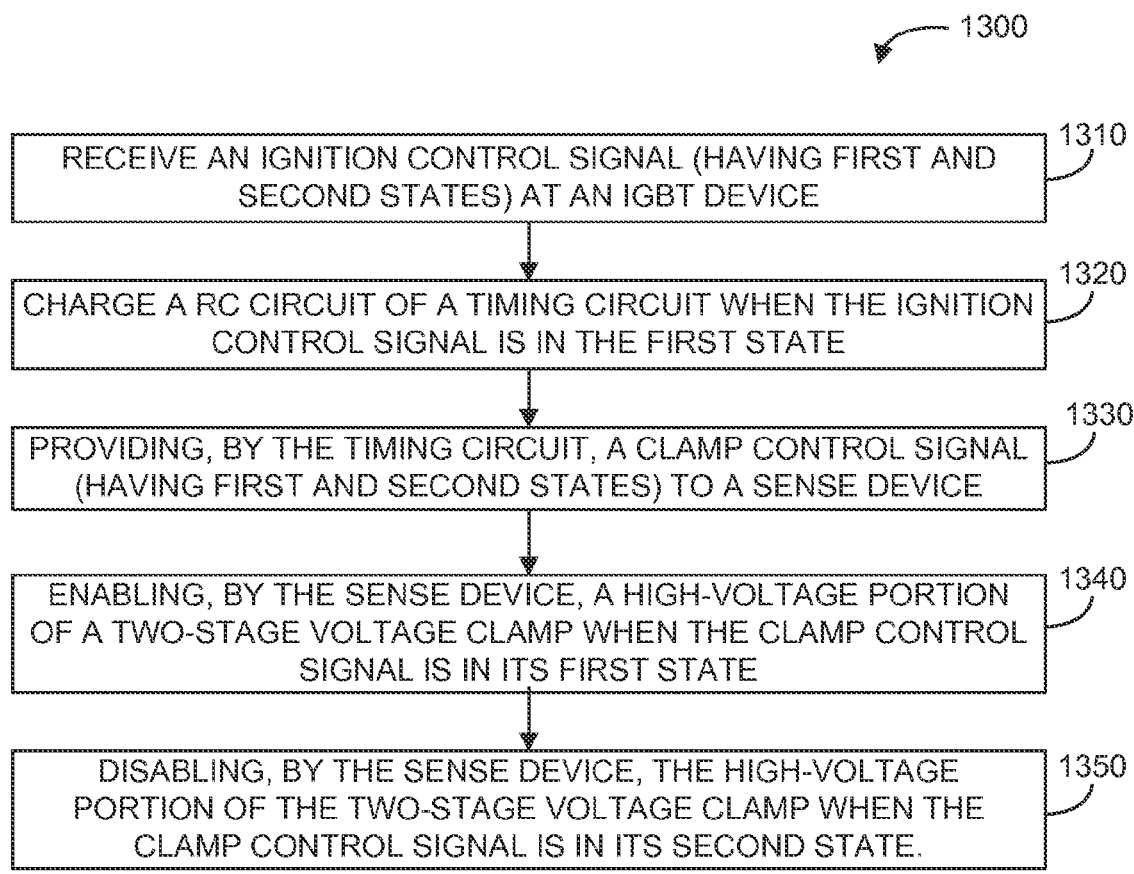
FIG. 13 is a flowchart illustrating a method of operating an ignition control circuit.

FIG. 13 is a flowchart illustrating a method 1300 of operating an ignition control circuit, according to an implementation. The method 1300 can be implemented in the apparatus (e.g., circuits) described herein. In other implementations, the method 1300 can be implemented in other circuits.

At block 1310, the method 1300 includes receiving an ignition control signal at an insulated gate bipolar transistor (IGBT) device. As described herein, the ignition control signal can have a first state and a second state, the first state of the ignition control signal causing the IGBT device to turn on, the second state of the ignition control signal causing the IGBT device to turn off. At block 1320, the method 1300 includes charging a resistive-capacitive (RC) circuit of a timing circuit when the ignition control signal is in the first state. The RC circuit can be configured to discharge when the ignition control signal is in the second state.

At block 1330, the method 1300 includes providing, by the timing circuit, a clamp control signal to a sense device. The clamp control signal can be in a first state when the RC circuit is charged to a voltage above a threshold voltage and a second state when the RC circuit is discharged to a voltage at or below the threshold voltage. At block 1340, the method 1300 includes enabling, by the sense device, a high-voltage portion of a two-stage voltage clamp when the clamp control signal is in its first state.

At block 1350, the method 1300 includes disabling, by the sense device, the high-voltage portion of the two-stage voltage clamp when the clamp control signal is in its second state. When the high-voltage portion is enabled (e.g., at block 1340), the method 1300 can also include clamping, by the two-stage voltage clamp, a collector voltage of the IGBT device at a voltage of greater than or equal to 350 V. When the high-voltage portion is disabled (e.g., at block 1350) the method 1300 can further include clamping, by the two-stage voltage clamp, the collector voltage of the IGBT device at a voltage of less than or equal to 30 V.

In the method 1300, as with the apparatus described herein, the ignition control signal can charge a capacitor of the RC circuit (e.g., when the ignition control state is in the first state). Further in the method 1300, disabling the high-voltage portion (of the two-stage voltage clamp) can include shorting, by the sense device, a first terminal of the high-voltage portion with a second terminal of the high-voltage portion.

The various apparatus and techniques described herein can be implemented using various semiconductor processing and/or packaging techniques. Some embodiments can be implemented using various types of semiconductor processing techniques associated with semiconductor substrates including, but not limited to, for example, Silicon (Si), Galium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details can be made. Any portion of the apparatus and/or methods described herein can be combined in any combination, except mutually exclusive combinations. The embodiments described herein can include various combinations and/or sub-combinations of the functions, components and/or features of the different embodiments described.

What is claimed is:

1. An apparatus, comprising:
   an insulated gate bipolar transistor (IGBT) device configured to control charging and discharging of an ignition coil;
   a two-stage voltage clamp coupled with the IGBT device including:
      a high-voltage portion coupled with the IGBT device; and
      a low-voltage portion coupled with the high-voltage portion and the IGBT device;
   a sense device coupled with the two-stage voltage clamp; and
   a timing circuit coupled with the sense device, the timing circuit being configured to provide a control signal to cause the sense device to enable or disable the high-voltage portion of the two-stage voltage clamp.

2. The apparatus of claim 1, wherein:
   the high-voltage portion of the two-stage voltage clamp includes a resistor having:
      a first terminal coupled with a collector terminal of the IGBT device and a first terminal of the sense device; and
      a second terminal coupled with a second terminal of the sense device; and
   the low-voltage portion of the two-stage voltage clamp includes a diode stack coupled between the second terminal of the resistor and a gate terminal of the IGBT device, the diode stack having a plurality of back-to-back diode pairs.

3. The apparatus of claim 2, wherein the diode stack has a blocking voltage less than or equal to 30 volts.

4. The apparatus of claim 1, wherein:
   the high-voltage portion of the two-stage voltage clamp includes a first diode stack having:
      a first terminal coupled with a collector terminal of the IGBT device and a first terminal of the sense device; and
      a second terminal coupled with a second terminal of the sense device; and
   the low-voltage portion of the two-stage voltage clamp includes a second diode stack coupled between the second terminal of the first diode stack and a gate terminal of the IGBT device.

5. The apparatus of claim 4, wherein:
   the first diode stack has a blocking voltage greater than or equal to 300 volts; and
   the second diode stack has a blocking voltage less than or equal to 30 volts.

6. The apparatus of claim 1, wherein the timing circuit includes:
   a resistive-capacitive circuit coupled between a gate terminal of the IGBT device and an electrical ground terminal; and
   a field effect transistor having:
      a gate terminal coupled with the resistive-capacitive circuit;
      a source terminal coupled with the electrical ground terminal; and
      a drain terminal coupled with a control terminal of the sense device.

7. The apparatus of claim 1, wherein the IGBT device is a first IGBT device, the sense device including a second IGBT device that is coupled in parallel with the high-voltage portion of the two-stage voltage clamp such that the second IGBT device being in an on-state disables the high-voltage portion of the two-stage voltage clamp.

8. The apparatus of claim 7, wherein the second IGBT device includes a first bipolar device segment and the first IGBT device includes a second bipolar device segment and a third bipolar device segment, the first bipolar device segment being disposed between the second bipolar device segment and the third bipolar device segment.

9. The apparatus of claim 1, wherein the timing circuit is configured to:
   enable the high-voltage portion of the two-stage voltage clamp in response to a gate-to-emitter voltage above a threshold voltage of the IGBT being applied to a gate terminal of the IGBT device; and
   disable the high-voltage portion of the two-stage voltage clamp after the gate-to-emitter voltage changes from the voltage above the threshold voltage to a voltage below the threshold voltage of the IGBT.

10. The apparatus of claim 9, wherein a time at which the high-voltage portion of the two-stage voltage clamp is disabled is based on a resistive-capacitive (RC) time constant of the timing circuit.

11. The apparatus of claim 1, wherein the high-voltage portion of the two-stage voltage clamp includes:
    a resistor; and
    a diode stack coupled with the resistor,
    the high-voltage portion of the two-stage voltage clamp being coupled between a collector terminal of the IGBT device and an emitter terminal of the IGBT device.

12. An apparatus, comprising:
    a first insulated gate bipolar transistor (IGBT) device configured to control charging and discharging of an ignition coil in response to an ignition control signal;
    a second IGBT device having a common collector terminal with the first IGBT device;
    a two-stage voltage clamp including:
       a high-voltage portion having a first terminal coupled with the common collector terminal and a second terminal coupled with an emitter terminal of the second IGBT device, the high-voltage portion being configured to be selectively enabled and disabled by the second IGBT device based on the ignition control signal; and a low-voltage portion coupled between the second terminal of the high-voltage portion and a gate terminal of the first IGBT device, the gate terminal of the first IGBT device being configured to receive the ignition control signal; and a timing circuit coupled with the gate terminal of the first IGBT device and a gate terminal of the second IGBT device, the timing circuit being configured to provide a clamp control signal to the gate terminal of the second IGBT device to selectively enable and disable the high-voltage portion of the two-stage voltage clamp, the clamp control signal being based on the ignition control signal.

13. The apparatus of claim 12, wherein the two-stage voltage clamp:
when the high-voltage portion is enabled, has a first clamping voltage; and
when the high-voltage portion is disabled, has a second clamping voltage, the second clamping voltage being less than the first clamping voltage.

14. The apparatus of claim 12, wherein the timing circuit includes:
a field effect transistor (FET) device; and
a resistive-capacitive (RC) circuit coupled with a gate terminal of the FET device and the gate terminal of the first IGBT device, the FET device being configured to provide the clamp control signal to the second IGBT device based on charging and discharging of the RC circuit by the ignition control signal.

15. The apparatus of claim 12, wherein the high-voltage portion includes a diode stack having a blocking voltage of greater than or equal to 300 V.

16. The apparatus of claim 12, wherein the low-voltage portion includes a diode stack having a blocking voltage of less than or equal to 30 V.

17. The apparatus of claim 12, wherein:
the high-voltage portion includes a resistor; and
the low-voltage portion includes a diode stack.

18. The apparatus of claim 12, wherein the high-voltage portion of the two-stage voltage clamp includes:
a resistor; and
a diode stack coupled in series with the resistor.

19. A method, comprising:
receiving an ignition control signal at an insulated gate bipolar transistor (IGBT) device, the ignition control signal having a first state and a second state, the first state of the ignition control signal causing the IGBT device to turn on, the second state of the ignition control signal causing the IGBT device to turn off;
charging a resistive-capacitive (RC) circuit of a timing circuit when the ignition control signal is in the first state, the RC circuit being configured to discharge when the ignition control signal is in the second state;
providing, by the timing circuit, a clamp control signal to a sense device, the clamp control signal being in a first state when the RC circuit is charged to a voltage above a threshold voltage, the clamp control signal being in a second state when the RC circuit is discharged to a voltage at or below the threshold voltage;
enabling, by the sense device, a high-voltage portion of a two-stage voltage clamp when the clamp control signal is in its first state; and
disabling, by the sense device, the high-voltage portion of the two-stage voltage clamp when the clamp control signal is in its second state.

20. The method of claim 19, further comprising:
clamping, by the two-stage voltage clamp when the high-voltage portion is enabled, a collector voltage of the IGBT device at a voltage of greater than or equal to 350 V; and
clamping, by the two-stage voltage clamp when the high-voltage portion is disabled, the collector voltage of the IGBT device at a voltage of less than or equal to 30 V.

21. The method of claim 19, wherein the ignition control signal charges a capacitor of the RC circuit.

22. The method of claim 19, wherein disabling the high-voltage portion includes shorting, by the sense device, a first terminal of the high-voltage portion with a second terminal of the high-voltage portion.

* * * * *